(12) United States Patent
Sekiya

(10) Patent No.: US 11,188,050 B2
(45) Date of Patent: Nov. 30, 2021

(54) MANAGEMENT METHOD OF PROCESSING TOOL

(71) Applicant: DISCO CORPORATION, Tokyo (JP)

(72) Inventor: Kazuma Sekiya, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 249 days.

(21) Appl. No.: 15/956,973

(22) Filed: Apr. 19, 2018

(65) Prior Publication Data

US 2018/0307199 A1 Oct. 25, 2018

(30) Foreign Application Priority Data

Apr. 21, 2017 (JP) .............................. JP2017-084706

(51) Int. Cl.
*G05B 19/402* (2006.01)
*G06Q 30/06* (2012.01)

(52) U.S. Cl.
CPC ....... *G05B 19/402* (2013.01); *G06Q 30/0633* (2013.01); *G05B 2219/37355* (2013.01)

(58) Field of Classification Search
CPC ...... G06F 3/121; G06F 3/1229; G06F 3/1203; G06F 3/1225; G06F 3/123; G06F 3/1235; G06F 3/1273; G06F 3/1287; G06F 3/1289; H04N 1/00344; H04N 1/00031; H04N 1/00037; H04N 1/00074; H04N 1/00244; H04N 2201/0094; B21D 31/04; B23P 11/005; B23P 9/025; B29C 67/00; C21D 7/02; G01B 13/10; G03G 15/0863; G03G 15/0875; G03G 21/1892; G03G 2215/0695; G03G 2215/0697; G03G 2221/1823; G03G 2221/1838; G05B 19/00; G05B 19/41815; G06Q 10/087; G06Q 10/0875; Y02P 90/08
USPC ...................................................... 235/383
See application file for complete search history.

(56) References Cited

U.S. PATENT DOCUMENTS

2006/0133831 A1* 6/2006 Rommelmann ... G03G 21/1892
399/12
2016/0219167 A1* 7/2016 Kaneko .............. H04N 1/00344

FOREIGN PATENT DOCUMENTS

| JP | 2001144034 A | | 5/2001 |
|---|---|---|---|
| JP | 2009046226 A | | 3/2009 |
| JP | 2009104272 A | | 5/2009 |
| JP | 2014033123 A | * | 2/2014 |
| JP | 2014065583 A | * | 4/2014 |

* cited by examiner

*Primary Examiner* — Thien M Le
*Assistant Examiner* — Tae W Kim
(74) *Attorney, Agent, or Firm* — Greer Burns & Crain, Ltd.

(57) ABSTRACT

Disclosed herein is a management method of a processing tool mounted to a processing apparatus. The management method includes an information input step of inputting product type information that indicates a product type and a serial number displayed on the processing tool or a case of the processing tool to the processing apparatus when the processing tool is mounted to the processing apparatus, and a tallying step of counting the number of inputs of the serial number regarding each identical product type and tallying the number of uses regarding each product type from the input information. Order timing of each product type is determined from the number of uses.

10 Claims, 8 Drawing Sheets

MANAGEMENT METHOD OF PROCESSING TOOL

BACKGROUND OF THE INVENTION

Field of the Invention

The present invention relates to a management method of a processing tool such as a cutting blade used in a cutting apparatus.

Description of the Related Art

Techniques are known in which a processing tool such as a cutting blade or a grinding wheel having a grinding abrasive is mounted to a processing apparatus such as a cutting apparatus or a grinding apparatus and processing is carried out to divide a plate-shaped workpiece such as a semiconductor wafer, resin package substrate, glass, or ceramic into individual chips or carry out thinning. When this processing tool is mounted to the processing apparatus, the size and product information (the size of abrasive grains, the kind of bond, and so forth) of the processing tool are input to the processing apparatus and the processing tool is mounted. An apparatus has also be developed with which, in the mounting, an identification code of product type information and so forth set on the processing tool or a case can be input by causing the apparatus to read the identification code for prevention of an error in the input and convenience (for example, refer to Japanese Patent Laid-Open No. 2001-144034 and Japanese Patent Laid-Open No. 2009-046226). The processing tool such as a cutting blade is a consumable and a user of the processing tool orders the necessary number of processing tools from a manufacturer as appropriate (for example, Japanese Patent Laid-Open No. 2009-104272).

SUMMARY OF THE INVENTION

When ordering a processing tool, a person in charge of the order checks the number of uses of the processing tool and decides the number of orders in order to make the order without waste. However, in every ordering, a lot of labor such as checking the stock status of a warehouse and checking the number of processing tools used in a certain period by viewing an apparatus, a management table, or the like is involved for collecting pieces of information for making the order.

Therefore, an object of the present invention is to provide a management method of a processing tool with which the number of uses of the processing tool can be easily counted and the number of orders can be easily decided based on the use status of the processing tool.

In accordance with an aspect of the present invention, there is provided a management method of a processing tool mounted to a processing apparatus. The management method includes an information input step of inputting product type information that indicates a product type and a serial number displayed on the processing tool or a case of the processing tool to the processing apparatus when the processing tool is mounted to the processing apparatus, and a tallying step of counting the number of inputs of the serial number regarding each identical product type and tallying the number of uses regarding each product type from the input information. Order timing of each product type is determined from the number of uses.

Preferably, the number of uses regarding each product type that is ordered in bulk and is used in a plurality of processing apparatuses is tallied in the tallying step. Preferably, the product type information and the serial number are read by a reading unit provided in the processing apparatus in the information input step. Preferably, the management method of a processing tool further includes a determination step of setting a threshold of the number of uses regarding each product type of the processing tool and determining the order timing based on whether or not the number of uses has reached the threshold.

According to the management method of a processing tool in accordance with the present invention, by only registering the product type information that indicates the product type and the serial number in a processing apparatus, the number of uses of the processing tool can be easily counted even when a large number of identical processing tools are used in plural of processing apparatuses. Thus, at the time of ordering of the processing tool, which is a consumable, the number of orders can be easily decided based on the use status of the processing tool.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
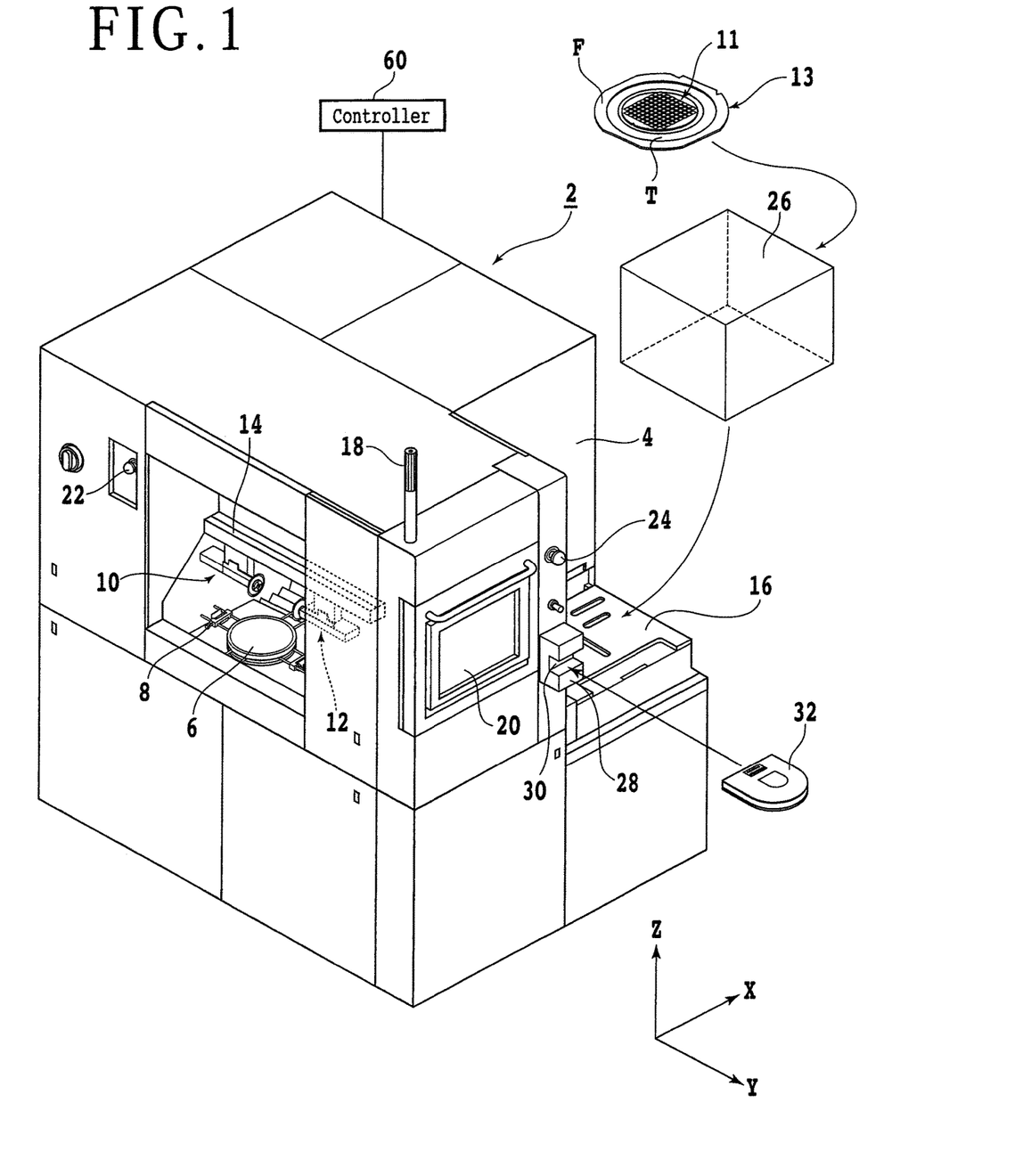
FIG. 1 is an appearance perspective view of a cutting apparatus.

An embodiment of the present invention will be described in detail below with reference to the drawings. Referring to FIG. 1, an overall perspective view of a cutting apparatus as one kind of a processing apparatus is depicted. A mechanism unit of a cutting apparatus 2 is housed in an exterior cover 4 formed of plural panels. Numeral 6 denotes a chuck table and the chuck table 6 is configured rotatably and movably in the X-axis direction. For the chuck table 6, plural clamps 8 that clamp a ring-shaped frame that supports a wafer with the intermediary of a dicing tape as is well known are disposed.

The cutting apparatus 2 has a first cutting unit 10 and a second cutting unit 12 disposed to line up in the Y-axis direction. The first cutting unit 10 and the second cutting unit 12 are both disposed to be guided by a guide rail 14 that extends in the Y-axis direction and be movable in the Y-axis direction and be also movable in the Z-axis direction (height direction). The cutting apparatus 2 is a so-called dual dicer having two spindles.

Numeral 16 denotes a cassette placement base on which a cassette 26 that houses plural wafers inside is placed and is configured movably in the upward-downward direction (Z-axis direction). Plural wafer units 13 in a form in which a wafer 11 is supported by a ring-shaped frame F with the intermediary of a dicing tape T are housed in the cassette 26 and are placed over the cassette placement base 16. Numeral 18 denotes an indication lamp that indicates the operation status of the cutting apparatus 2. The indication lamp 18 is lit in green for example when the cutting apparatus 2 normally operates, and blinks in red if some kind of breakdown has occurred.

Numeral 20 denotes a display monitor of a touch panel system. An operator can input an operation command of the apparatus to the display monitor 20 and the operation status of the apparatus is displayed on the display monitor 20. Numerals 22 and 24 denote emergency stop buttons. When pressing the emergency stop button 22 or 24, the operator can immediately stop the operation of the cutting apparatus 2. A reading unit 28 having a reading part 30 is disposed adjacent to the display monitor 20.

Figure 2:
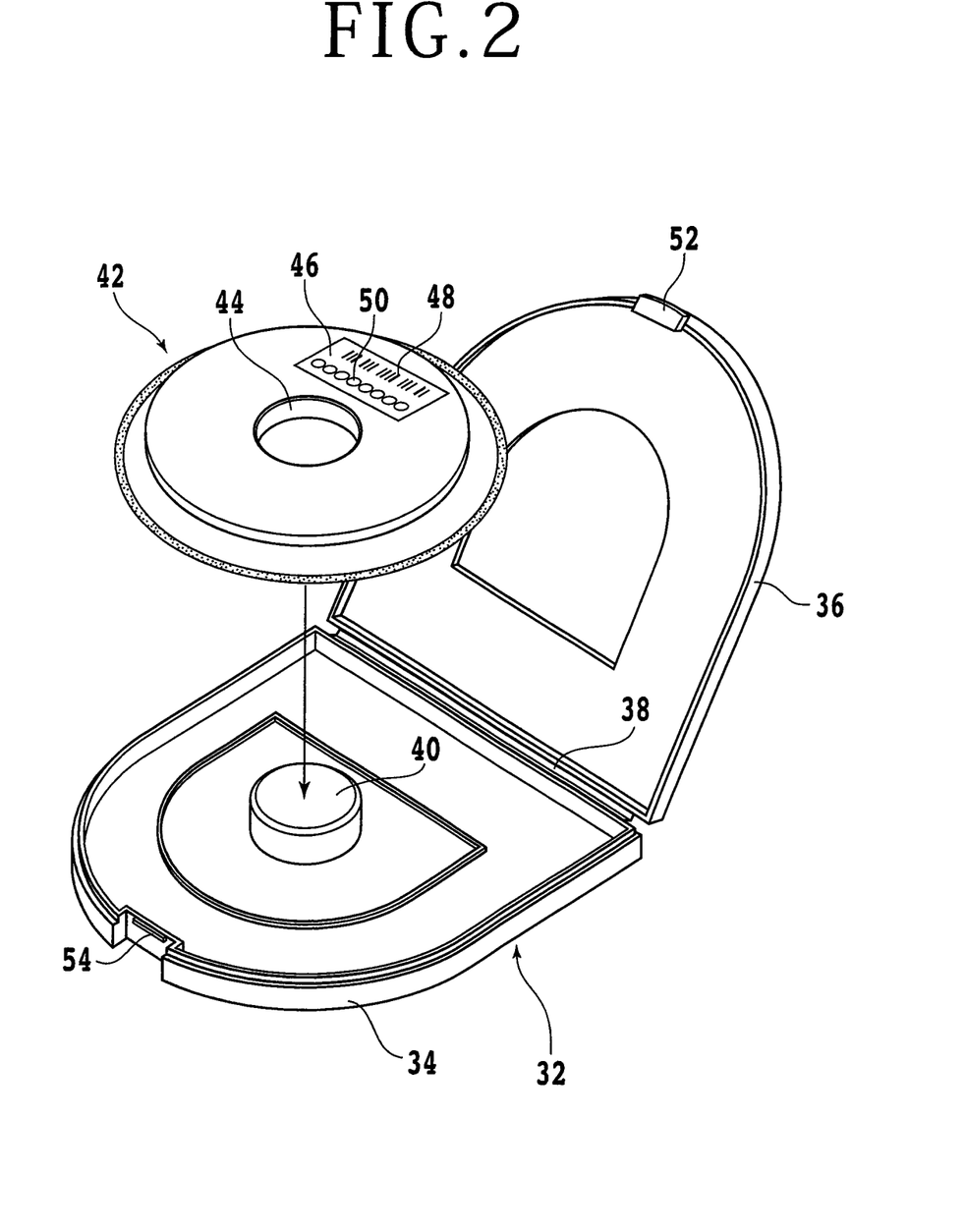
FIG. 2 is an exploded perspective view depicting the state in which a cutting blade is housed in a housing case.

Referring to FIG. 2, an exploded perspective view that represents how a cutting blade 42 is housed in a housing case 32 is depicted. The housing case 32 is formed of a molded body of a resin and it is preferable for the housing case 32 to be transparent. The housing case 32 is composed of a main body case 34 and a cover 36 attached to the main body case 34 openably and closably by a hinge part 38. In the main body case 34, a circular projection part 40 to which a mounting hole 44 of the cutting blade 42 is fitted is formed. A hook 52 is monolithically formed in the cover 36 and the cover 36 is held in the closed state with respect to the main body case 34 by engaging the hook 52 with an engagement protrusion 54 formed in the main body case 34.

Figure 3:
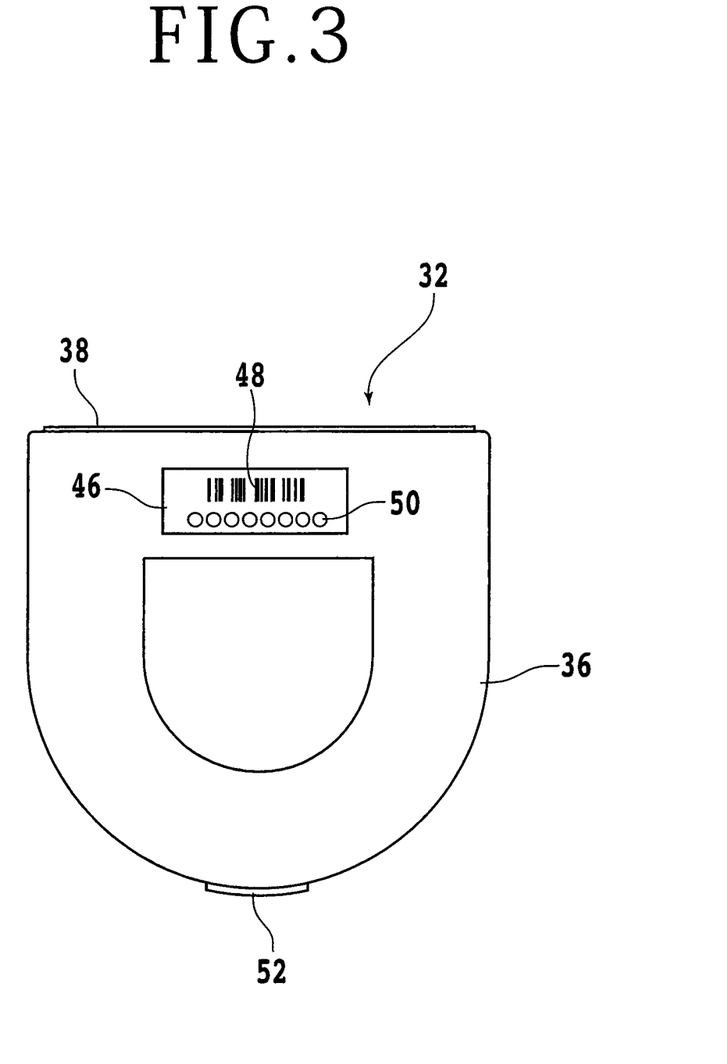
FIG. 3 is a plan view of the housing case.

To the cutting blade 42, a sticker 46 on which product type information 48 and a serial number 50 of the cutting apparatus 2 are printed is stuck. The product type information 48 includes information on the product type of the cutting blade, such as a hub blade or a washer blade, the size of the cutting blade, and so forth. In the present embodiment, the product type information 48 is formed of a barcode. The serial number 50 is configured through giving numbers, characters, symbols, and so forth different for each cutting blade. The manufacturing history and so forth of the cutting blade can be tracked from the serial number. Referring to FIG. 3, a plan view of the housing case 32 is depicted. Also to the housing case 32, a sticker 46 on which the product type information 48 and the serial number 50 identical to the product type information 48 and the serial number 50 of the cutting blade housed inside are printed is stuck.

Figure 4:
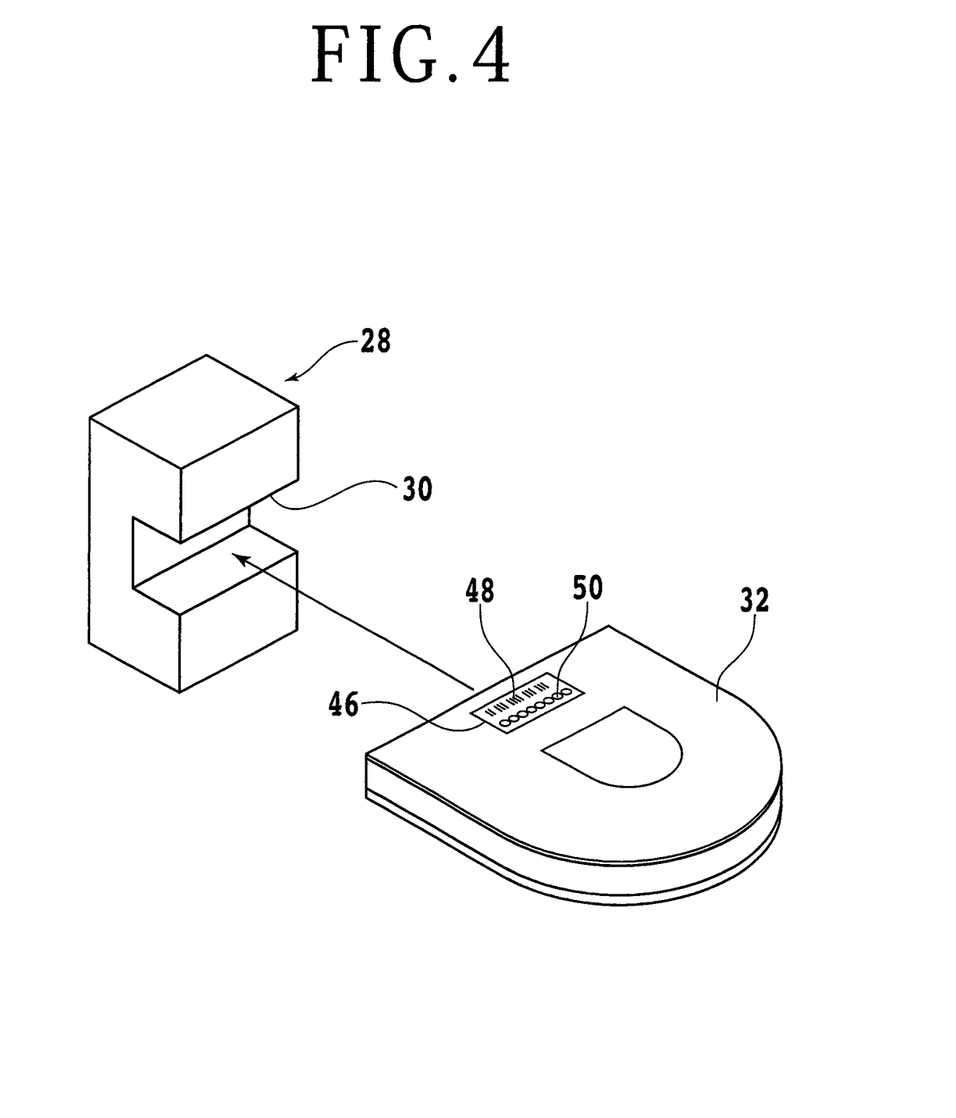
FIG. 4 is a perspective view depicting an information registration step.

If cutting processing of a workpiece is continued with the first cutting unit 10 or the second cutting unit 12 and a crack is caused in the cutting blade or the cutting blade wears to a substantial degree, a new cutting blade needs to be mounted to the spindle of the first cutting unit 10 or the second cutting unit 12. In such a case, as depicted in FIG. 4, an operator causes the reading part 30 of the reading unit 28 to read the product type information 48 and the serial number 50 printed on the sticker 46 stuck to the housing case 32 in which the new cutting blade is housed, and stores the product type information 48 and the serial number 50 of the cutting blade in a memory of a controller 60 of the cutting apparatus 2.

Figure 5:
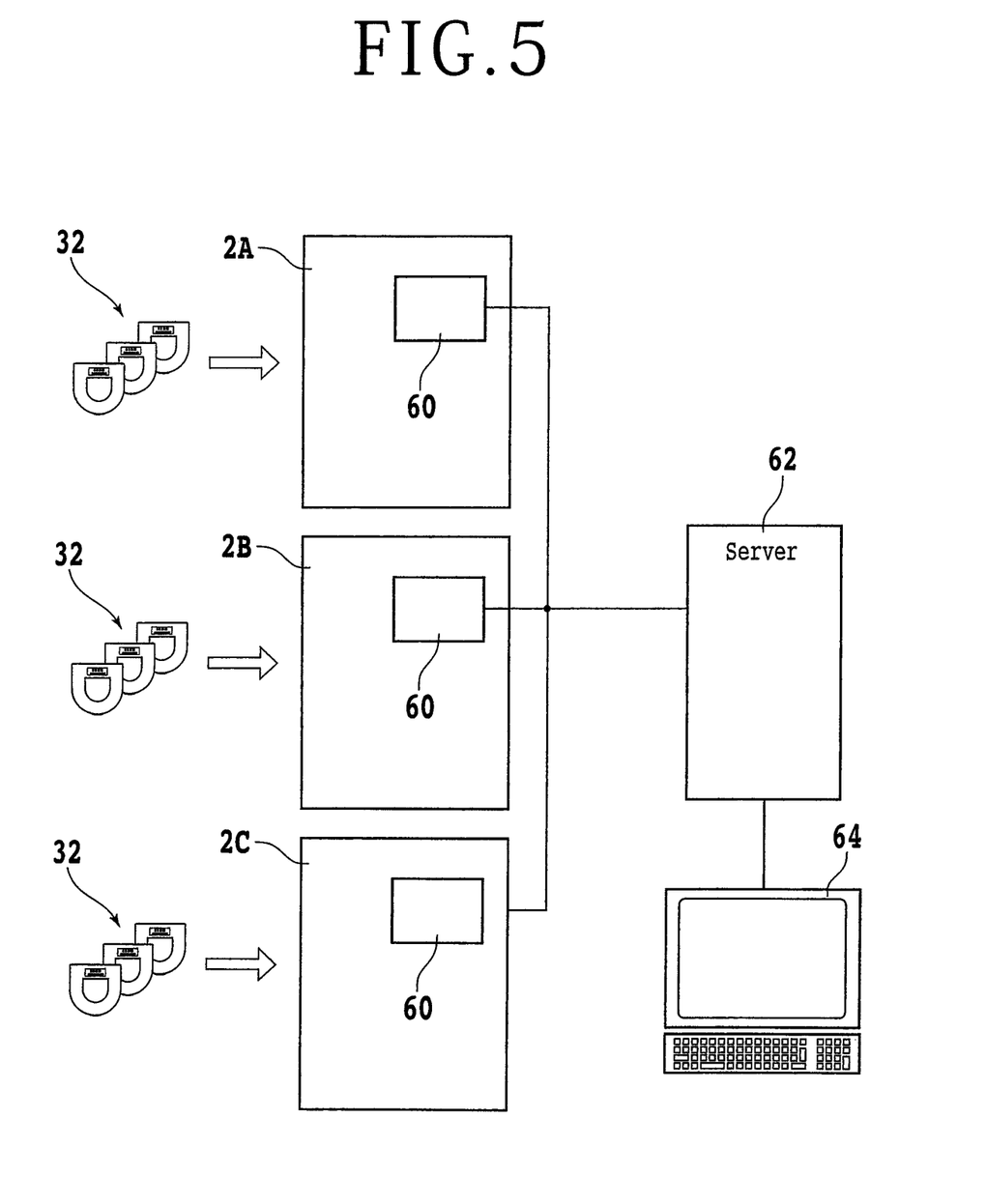
FIG. 5 is a system configuration diagram to which a management method of the present invention is applied.

A management method of a processing tool in the embodiment of the present invention will be described below with reference to FIG. 5 to FIG. 8. FIG. 5 is a block diagram of a system to which the management method of a processing tool in the embodiment of the present invention is applied. Plural cutting apparatuses 2A, 2B, and 2C each having the controller (control unit) 60 are connected to a server 62 and the server 62 is connected to plural computer terminals 64 (only one is depicted in the diagram).

When a new cutting blade is mounted to the cutting apparatus 2A, 2B, or 2C, the product type information 48 and the serial number 50 on the sticker 46 stuck to the housing case 32 are read by the reading unit 28, and these pieces of information are stored in the controller 60 of the cutting apparatus of the mounting target and are transmitted to the server 62. In the server 62, from the information input from the reading unit 28, the number of inputs of the serial number 50 is counted regarding each identical product type of a cutting blade and the number of uses regarding each identical product type is tallied.

Figure 6A:
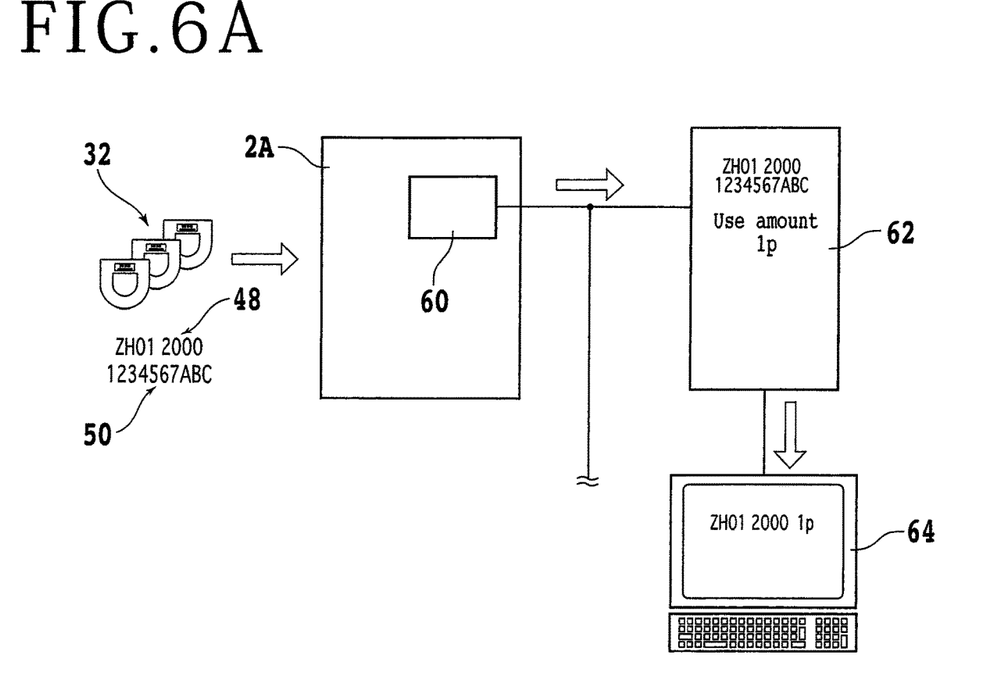
FIG. 6A and FIG. 6B are block diagrams for explaining an information input step and a count step.

For example, as depicted in FIG. 6A, when the reading unit 28 is caused to read the product type information 48 and the serial number 50 in mounting a cutting blade whose product type information 48 is ZH01 2000 and whose serial number 50 is 1234567ABC to the cutting apparatus 2A, the use amount (the number of uses) of the cutting blade whose product type information 48 is ZH01 2000 and whose serial number 50 is 1234567ABC is registered in the server 62 and the information in the server 62 can be called also in the computer terminal 64.

Figure 6B:
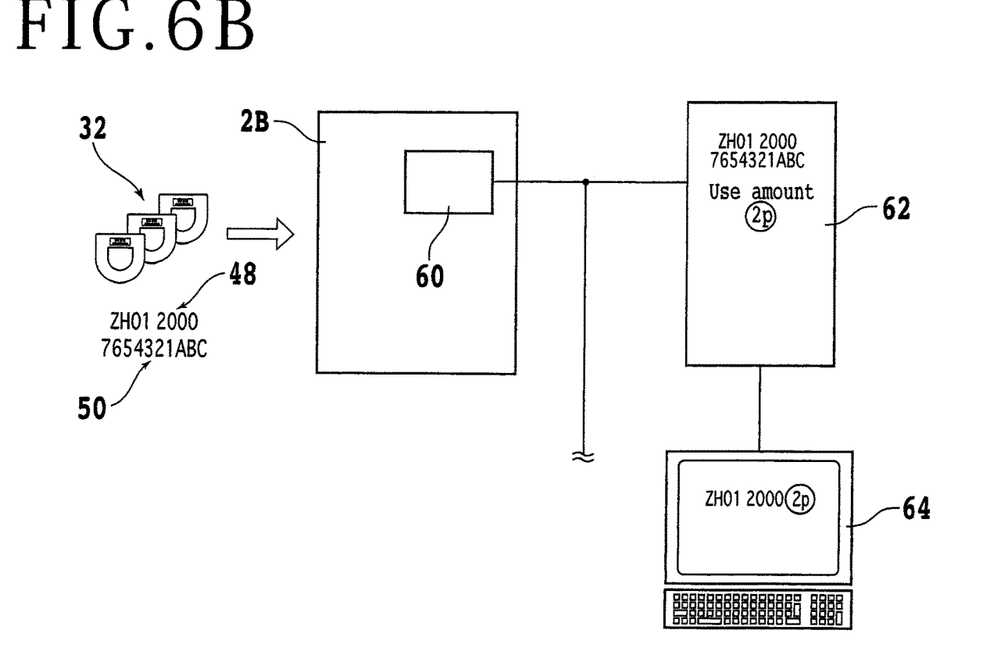

Subsequently, as depicted in FIG. 6B, when a cutting blade that has the identical product type information 48 and whose serial number 50 is 7654321ABC is mounted to the cutting apparatus 2B, in the server 62, it is determined that the serial number 50 is different from the cutting blade used in the cutting apparatus 2A in FIG. 6A but a cutting blade of ZH01 2000 as the identical product type is used, and two is registered as the use amount of the cutting blade with the product type information ZH01 2000. The information in the server 62 can be checked also by the computer terminal 64.

Figure 7:
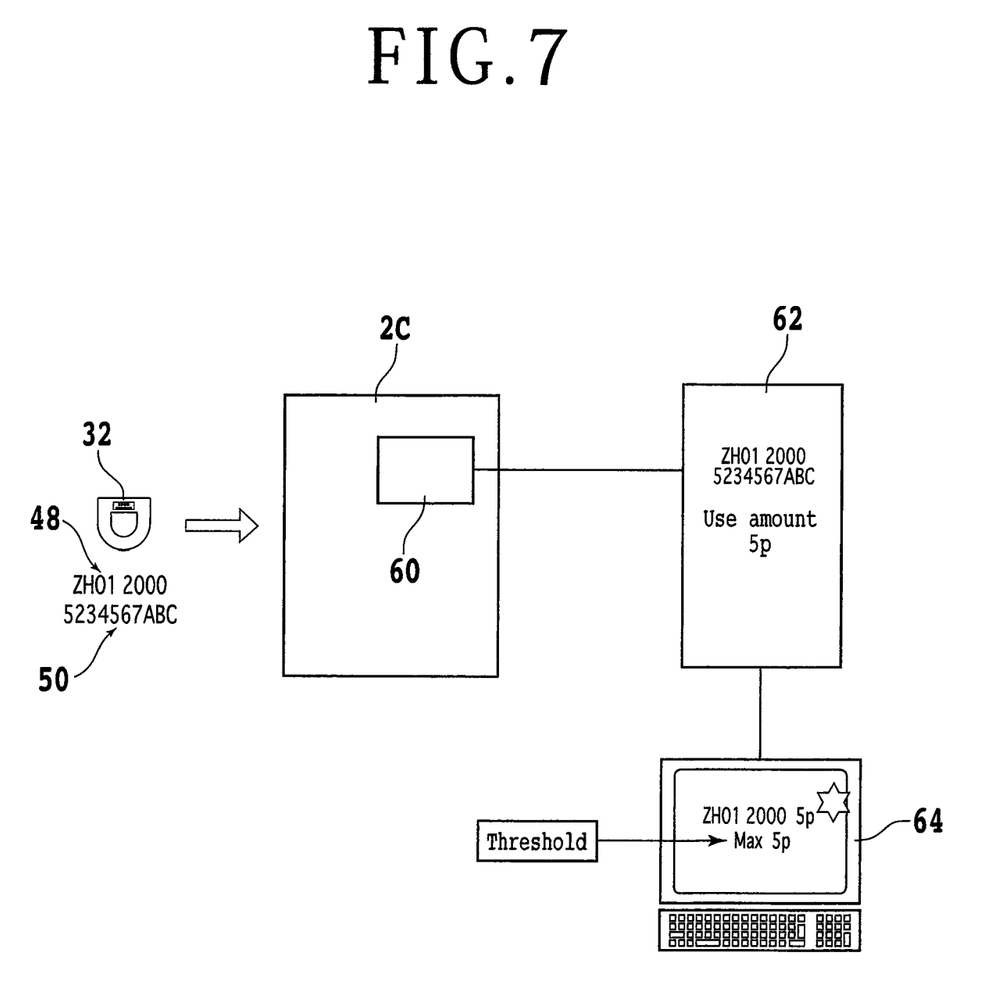
FIG. 7 is a block diagram for explaining a determination step.

When the use amount of the cutting blade of the identical product type reaches a certain number, the cutting blade of the product type needs to be ordered from the manufacturer side. Therefore, for example as depicted in FIG. 7, the threshold of the cutting blade of the identical product type is set to five, for example. When the number of cutting blades of the product type information ZH01 2000 used in the cutting apparatus 2A, 2B, or 2C reaches five as the threshold, the server 62 determines that the use amount of the cutting blade of this product type has reached the threshold. This determination result can be checked also by the computer terminal 64 and thus an operator of the cutting apparatus or a person in charge of purchasing orders the necessary number of cutting blades of the product type information ZH01 2000 from the manufacturer side.

Figure 8:
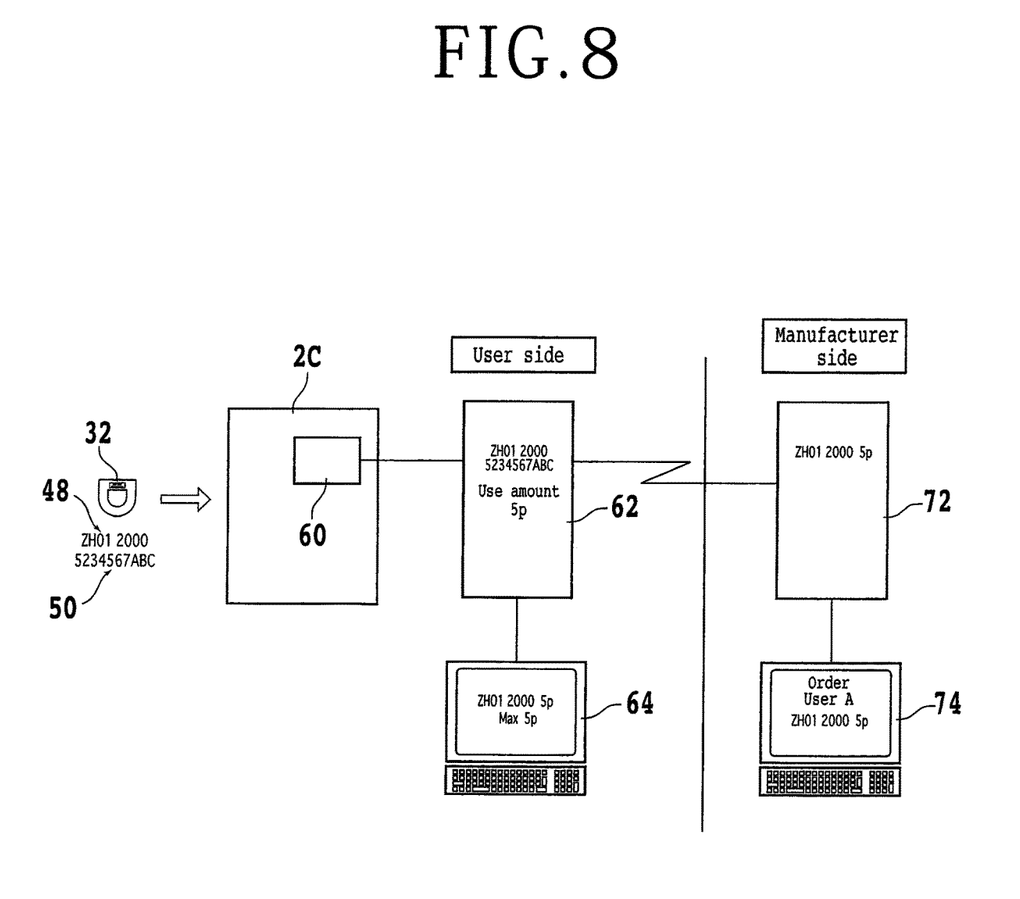
FIG. 8 is a block diagram for explaining an order step.

The order of the cutting blade can be made as depicted in FIG. 8. Specifically, the server 62 on the user side and a server 72 on the manufacturer side are connected by a communication line. When the use amount of a cutting blade of a predetermined product type reaches the threshold set in advance, order information is transmitted from the server 62 on the user side to the server 72 on the manufacturer side. Then, a person in charge on the manufacturer side checks this order information by a computer terminal 74 and carries out setting to deliver a predetermined number of cutting blades to user A.

In the above-described embodiment, the cutting blade of the cutting apparatus 2 is employed as the processing tool and the management method of the cutting blade is explained. However, the processing tool is not limited to the cutting blade and other processing tools and so forth such as a grinding wheel of a grinding apparatus and a polishing pad of a polishing apparatus can also be managed by the same method.

In the above-described embodiment, the example in which the product type information 48 and the serial number 50 are attached to a processing tool such as a cutting blade by a sticker is depicted. However, they may be drawn directly on a tool by a stamp or the like.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A management method of a processing tool mounted to a processing apparatus, the management method comprising:
   an information input step of inputting product type information to the processing apparatus when the processing tool is mounted to the processing apparatus, wherein the product type information, displayed on the processing tool or a case of the processing tool, indicates a product type and a serial number;
   operating the processing apparatus to modify a workpiece held by a chuck table, wherein the processing apparatus is a cutting apparatus of a plurality of cutting apparatuses operated at a single manufacturing site, and wherein the processing tool is a cutting blade; and
   a tallying step of counting inputs of serial numbers belonging to each identical product type of cutting blade and tallying a number of uses of the each identical product type in the plurality of cutting apparatuses, wherein the serial numbers are from the information input step, wherein a resulting tally is configured to include more than one use associated with each serial number of the serial numbers,
   wherein order timing of the each identical product type of cutting blade is determined from the number of uses, and wherein the number of uses of the each identical product type of cutting blade in the plurality of cutting apparatuses is tallied in the tallying step and the each identical product type of cutting blade is ordered in bulk.

2. The management method of a processing tool according to claim 1, wherein the product type and the serial number are read by a reading unit provided in the processing apparatus in the information input step.

3. The management method of a processing tool according to claim 1, further comprising:
   a determination step of setting a threshold of the number of uses regarding each product type of the processing tool and determining the order timing based on whether or not the number of uses has reached the threshold.

4. The management method of a processing tool according to claim 3, further comprising:
   an ordering step, wherein upon determining the order timing based on whether or not the number of uses has reached the threshold, an order is placed including product type of a predetermined quantity.

5. A management method of a processing tool mounted to a processing apparatus, the management method comprising:
   an information input step of inputting product type information to the processing apparatus when the processing tool is mounted to the processing apparatus, wherein the product type information, displayed on the processing tool or a case of the processing tool, indicates a product type and a serial number;
   operating the processing apparatus to modify a workpiece held by a chuck table, wherein the processing apparatus is a grinding apparatus of a plurality of grinding apparatuses operated at a single manufacturing site, and wherein the processing tool is a grinding wheel; and
   a tallying step of counting inputs of serial numbers belonging to each identical product type of
   grinding wheel and tallying a number of uses of the each identical product type in the plurality of grinding apparatuses, wherein the serial numbers are from the information input step, wherein a resulting tally is configured to include more than one use associated with each serial number of the serial numbers,
   wherein order timing of the each identical product type of grinding wheel is determined from the number of uses, and wherein the number of uses of the each identical product type of grinding wheel in the plurality of grinding apparatuses is tallied in the tallying step and the each identical product type of grinding wheel is ordered in bulk.

6. The management method of a processing tool according to claim 5, further comprising:
   a determination step of setting a threshold of the number of uses regarding each product type of the processing tool and determining the order timing based on whether or not the number of uses has reached the threshold.

7. The management method of a processing tool according to claim 6, further comprising:
   an ordering step, wherein upon determining the order timing based on whether or not the number of uses has reached the threshold, an order is placed including product type of a predetermined quantity.

8. A management method of a processing tool mounted to a processing apparatus, the management method comprising:
   an information input step of inputting product type information to the processing apparatus when the processing tool is mounted to the processing apparatus, wherein the product type information, displayed on the processing tool or a case of the processing tool, indicates a product type and a serial number;
   operating the processing apparatus to modify a workpiece held by a chuck table, wherein the processing apparatus is a polishing apparatus of a plurality of polishing apparatuses operated at a single manufacturing site, and wherein the processing tool is a polishing pad; and
   a tallying step of counting inputs of serial numbers belonging to each identical product type of
   polishing pad and tallying of uses of the each identical product type in the plurality of polishing apparatuses, wherein the serial numbers are from the information input step, wherein a resulting tally is configured to include more than one use associated with each serial number of the serial numbers,
   wherein order timing of the each identical product type of polishing pad is determined from the number of uses, and wherein the number of uses of the each identical product type of polishing pad in the plurality of polishing apparatuses is tallied in the tallying step and the each identical product type of polishing pad is ordered in bulk.

9. The management method of a processing tool according to claim 8, further comprising:
   a determination step of setting a threshold of the number of uses regarding each product type of the processing tool and determining the order timing based on whether or not the number of uses has reached the threshold.

10. The management method of a processing tool according to claim 9, further comprising:
an ordering step, wherein upon determining the order timing based on whether or not the number of uses has reached the threshold, an order is placed including product type of a predetermined quantity.

\* \* \* \* \*